(12) United States Patent
Robertson

(10) Patent No.: US 12,480,606 B2
(45) Date of Patent: Nov. 25, 2025

(54) PINCH VALVE TUBES USEFUL WITH PINCH VALVE SYSTEMS

(71) Applicant: Clippard Instrument Laboratory, Inc., Cincinnati, OH (US)

(72) Inventor: Douglas E. Robertson, Cincinnati, OH (US)

(73) Assignee: Clippard Instrument Laboratory, Inc., Cincinnati, OH (US)

( * ) Notice: Subject to any disclaimer, the term of this patent is extended or adjusted under 35 U.S.C. 154(b) by 55 days.

(21) Appl. No.: 18/430,971

(22) Filed: Feb. 2, 2024

(65) Prior Publication Data

US 2025/0027585 A1 Jan. 23, 2025

Related U.S. Application Data

(60) Provisional application No. 63/513,972, filed on Jul. 17, 2023.

(51) Int. Cl.
*F16L 11/12* (2006.01)
*F16K 7/04* (2006.01)

(52) U.S. Cl.
CPC ............. *F16L 11/121* (2013.01); *F16K 7/04* (2013.01)

(58) Field of Classification Search
CPC F16L 11/121; F16L 55/10; F16K 7/07; F16K 7/04
USPC ............................................................ 251/7
See application file for complete search history.

(56) References Cited

U.S. PATENT DOCUMENTS

| | | | | |
|---|---|---|---|---|
| 2,633,154 A | * | 3/1953 | Eastman | F16K 7/07 251/5 |
| 3,441,245 A | * | 4/1969 | Holland | F16K 7/07 251/5 |
| 3,498,316 A | * | 3/1970 | Humphrey | F16K 7/06 251/7 |
| 3,996,968 A | * | 12/1976 | Bergman | F16L 11/121 138/128 |
| 5,947,348 A | * | 9/1999 | Briski | F16K 7/065 222/640 |
| 6,029,711 A | * | 2/2000 | Koch | F04B 43/0072 138/172 |
| 2018/0051833 A1 | * | 2/2018 | Wallin | B29C 59/007 |

* cited by examiner

*Primary Examiner* — Craig M Schneider
*Assistant Examiner* — Andrew J Rost
(74) *Attorney, Agent, or Firm* — Faegre Drinker Biddle & Reath LLP

(57) ABSTRACT

A pinch valve tube includes an open interior through which a fluid can be conveyed. The open interior is non-circular and can be defined by two opposing sides which, when the pinch valve tube is compressed, move toward one another in a more linear fashion than a circular cross section of the open interior. In one form the open interior is defined by a first side which has a bell shape. The bell shape can include a central head connected to opposing flattened lips by opposing waist sides, respectively. The second side can be a mirror image of the first side. In some forms the second side may not be a mirror image. An outer surface of the pinch valve tube can include a central flat upon which an anvil and support surface can be engaged to compress the pinch valve tube.

7 Claims, 16 Drawing Sheets

PINCH VALVE TUBES USEFUL WITH PINCH VALVE SYSTEMS

PRIORITY INFORMATION

The present application claims the benefit of U.S. Provisional Patent Application No. 63/513,972 filed Jul. 17, 2023, and which is incorporated herein by reference in its entirety.

TECHNICAL FIELD

The present disclosure generally relates to pinch valve systems, and more particularly, but not exclusively, to pinch valve tubes used in pinch valve systems.

BACKGROUND

Providing the ability to provide a greater linear response from pinch valve tubes remains an area of interest. Some existing systems have various shortcomings relative to certain applications. Accordingly, there remains a need for further contributions in this area of technology.

SUMMARY

One embodiment of the present disclosure is a unique pinch valve tube. Other embodiments include apparatuses, systems, devices, hardware, methods, and combinations for use with the unique pinch valve tube. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
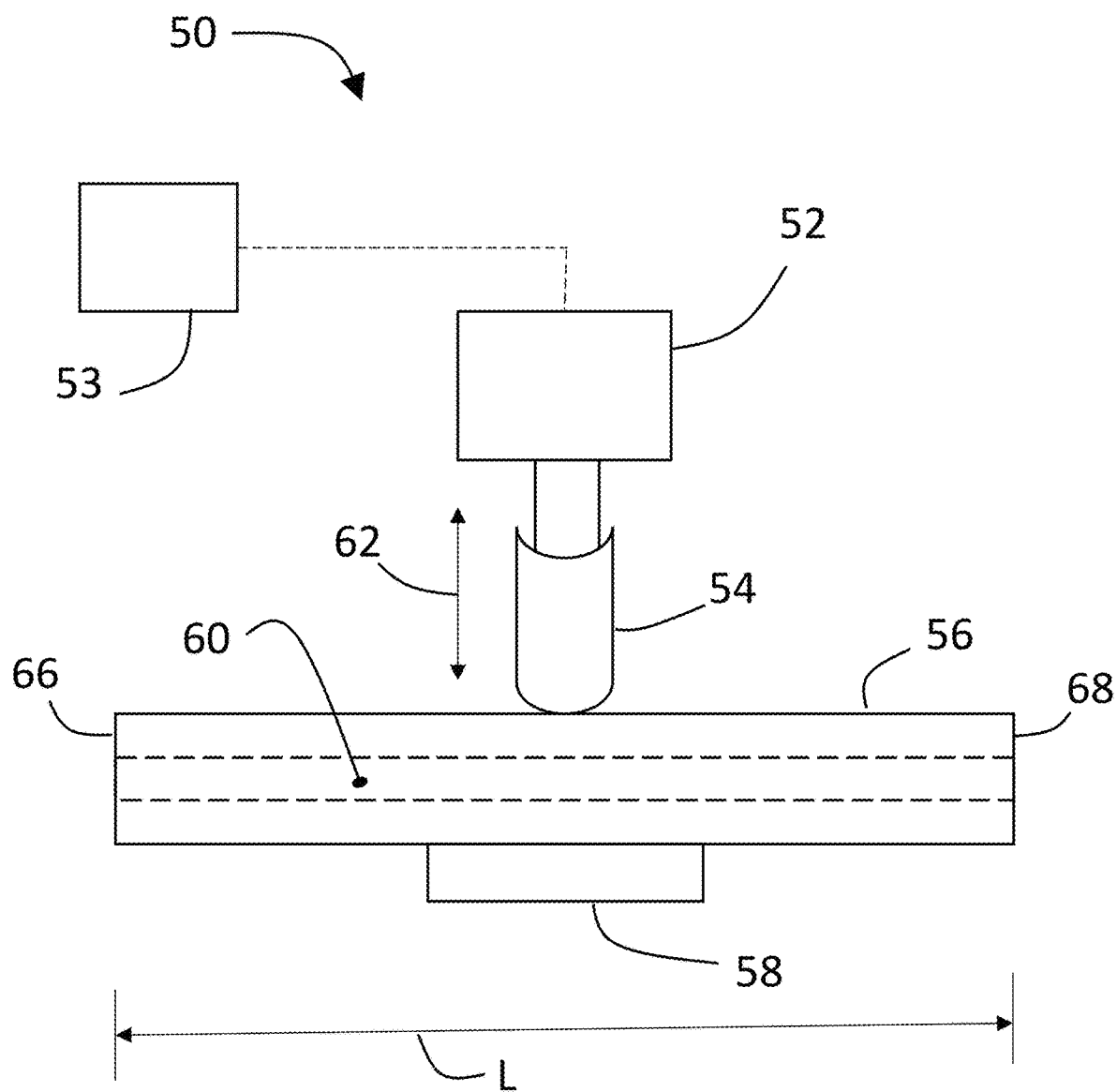
FIG. 1 depicts one embodiment of a pinch valve system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A pinch valve system is disclosed herein which include an actuator used to move an anvil which provides a compressive pinch to a pinch valve tube. The actuator can be controlled with a controller. The pinch valve tube includes an open interior having a non-circular shape. The open interior can include a first side and second side each having a bell shape. The non-circular open interior can provide a more linear response between flow rate provided through the pinch valve tube and a reduction in cross-sectional area of the open interior by virtue of compression applied to the tube.

Proportional Control of flow and/or pressure of a fluid or gas media through the pinch valve tube is achieved in proportionally controlled pinch valves that pinch or clamp an elastomeric tubing with a plunger or an anvil. The elastomeric tubing material of the pinch valve tube can be molded or extruded or printed (e.g., 3-D printed such as through additive manufacturing) from a number of grades of rubber, such as silicones, nitriles, fluoroelastomers, and etc., or formulations of thermoplastic elastomers (TPEs) such as polyurethanes, polyethylenes, and etc.

Turning now to FIG. 1, one embodiment of a pinch valve system 50 includes an actuator 52 configured to drive an anvil 54 to engage a pinch valve tube 56 for purposes of compressing the pinch valve tube 56 between the anvil 54 and a support surface 58. Though the support surface 58 is depicted as flat in the illustrated embodiment, in some embodiments the support surface 58 can be a mirror image of the drive anvil 54. The actuator 52 can take any variety of forms including a stepper controlled linear actuator, solenoid actuator acting against a proportional spring element, differential pressure acting on a pneumatic or hydraulic piston, proportionally controlled pneumatic pressure acting on a piston against a proportional spring element, to set forth just a few non-limiting examples. The actuator 52 can be controlled with a controller 53 useful to actuate the actuator 52 and move the anvil 54. The controller 53 can be used to provide either open loop or closed loop commands to the actuator 52.

Compressing the pinch valve tube 56 enables the regulation of a fluid travelling through an open interior 60 of the pinch valve tube 56. The pinch valve tube 56 is of a compressible construction having a flexible material that can deform when an external force is applied to it (e.g., an external force generated via relative movement of the anvil 54 and support surface 58) and resume its original shape upon removal of the force. Deformation of the pinch valve tube 56 via compression creates a corresponding change in shape of the open interior 60, where the change in shape creates a corresponding change in cross sectional area of the open interior 60.

In the illustrated embodiment, the actuator 52 is configured to reciprocate the anvil 54 toward and away from the pinch valve tube 56 as indicated by arrow 62, where a direction of the anvil 54 toward the pinch valve tube 56 can result in a reduction in cross sectional area of the open interior 60 via compression, and resultant reduction in flow rate of a fluid (e.g., mass flow rate, volumetric flow rate) through the pinch valve tube 56. The flexible material of the pinch valve tube 56 is capable of storing energy as the flexible material is compressed, with the amount of energy stored in proportion to the compression. In some embodiment, the flexible material acts like a spring, storing energy when compressed and releasing energy when uncompressed.

Moving the anvil 54 away from the pinch valve tube 56 results in an increase in cross sectional area of the open interior 60, and resultant increase in flow rate of a fluid through the pinch valve tube 56. The stored energy via the flexible material is used to return the cross sectional area of the open interior 60 back to the uncompressed shape when force is removed by retraction of the anvil 54. As provided herein, various embodiments of the pinch valve tube 56, and specifically the shape of the open interior 60, provide a more linear relationship between compression of the pinch valve tube 56 as it relates to a flow of fluid through the open interior 60. The pinch valve tube 56 extends from a proximal end 66 to a distal end 68 with a length L of tubing extending between the proximal end 66 and the distal end 68. Though the pinch valve tube 56 is laid out in a straight line in the illustrated embodiment, in some forms the tube may have a non-straight shape, such as, but not limited to, curved ends 66 and/or 68. It will be appreciated that the length L between the ends 66 and 68 can be the length of tubing that corresponds to the outstretched tube.

Figure 2:
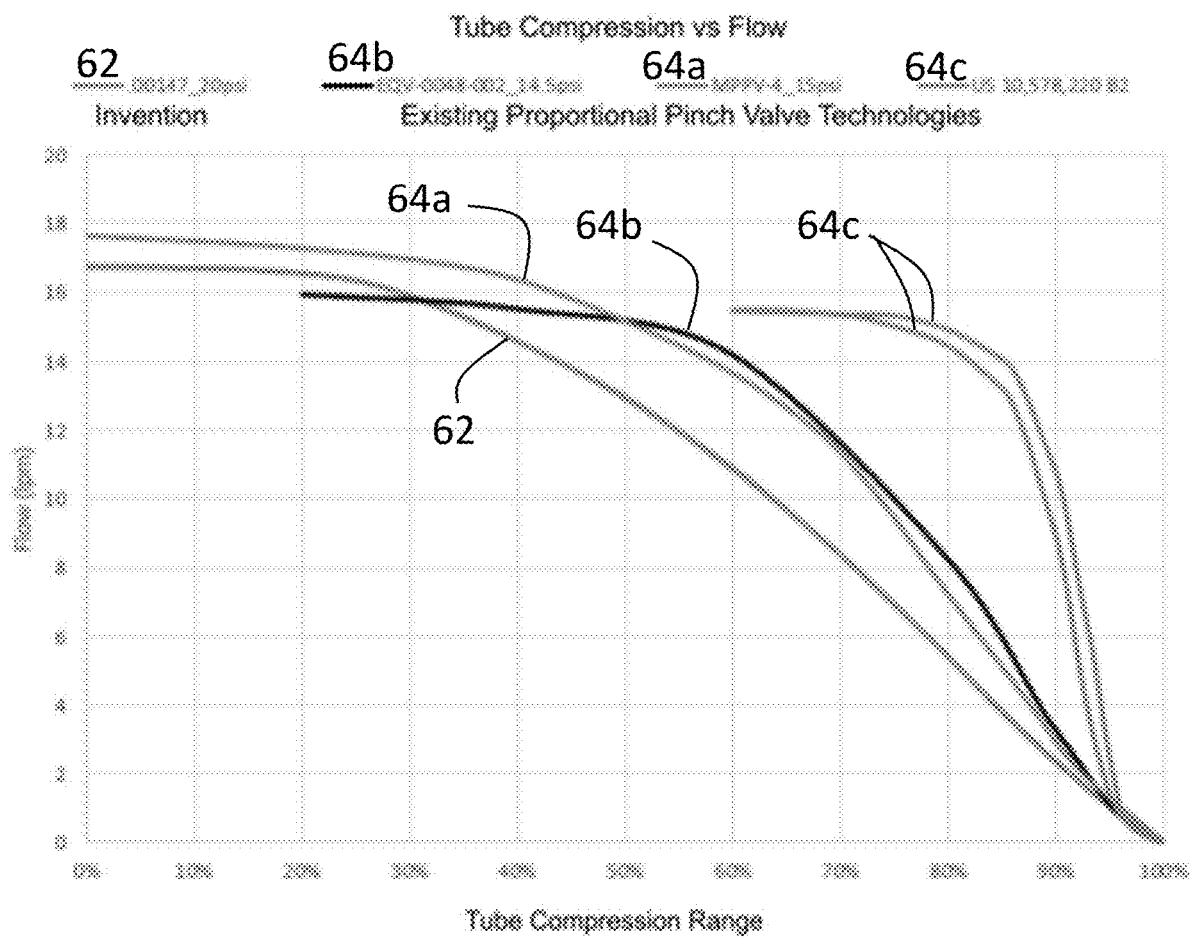
FIG. 2 depicts the relationship between the pinch valve tube of the instant application against those of the prior art.

FIG. 2 illustrates the relationship between the pinch valve tube 56 of the instant application with pinch valve tubes 56 of the prior art. The pinch valve tubes 56 of the prior art utilize circular cross-sectional area of their open interiors, while the pinch valve tube 56 of the instant application utilizes non-circular cross sectional areas of the open interior 60. As can be seen in the figure, in some prior art tubes, compression and collapsing of the open interior which is required to occur in order to proportionally change the flow of media, requires the concentric circular geometry tubing of the prior art to be compressed over 60%, and often over 80%, of the compressible range of the tube before linear proportional flow control is initiated, thereby limiting the effective proportional flow control range of the pinch valve. The relatively more linear relationship 62 of the pinch valve tube 56 of the instant application can be seen in FIG. 2 in comparison to the non-linear relationships 64a, 64b, 64c shown in the prior art having circular cross-sectional area of their respective open interiors.

Figure 3:
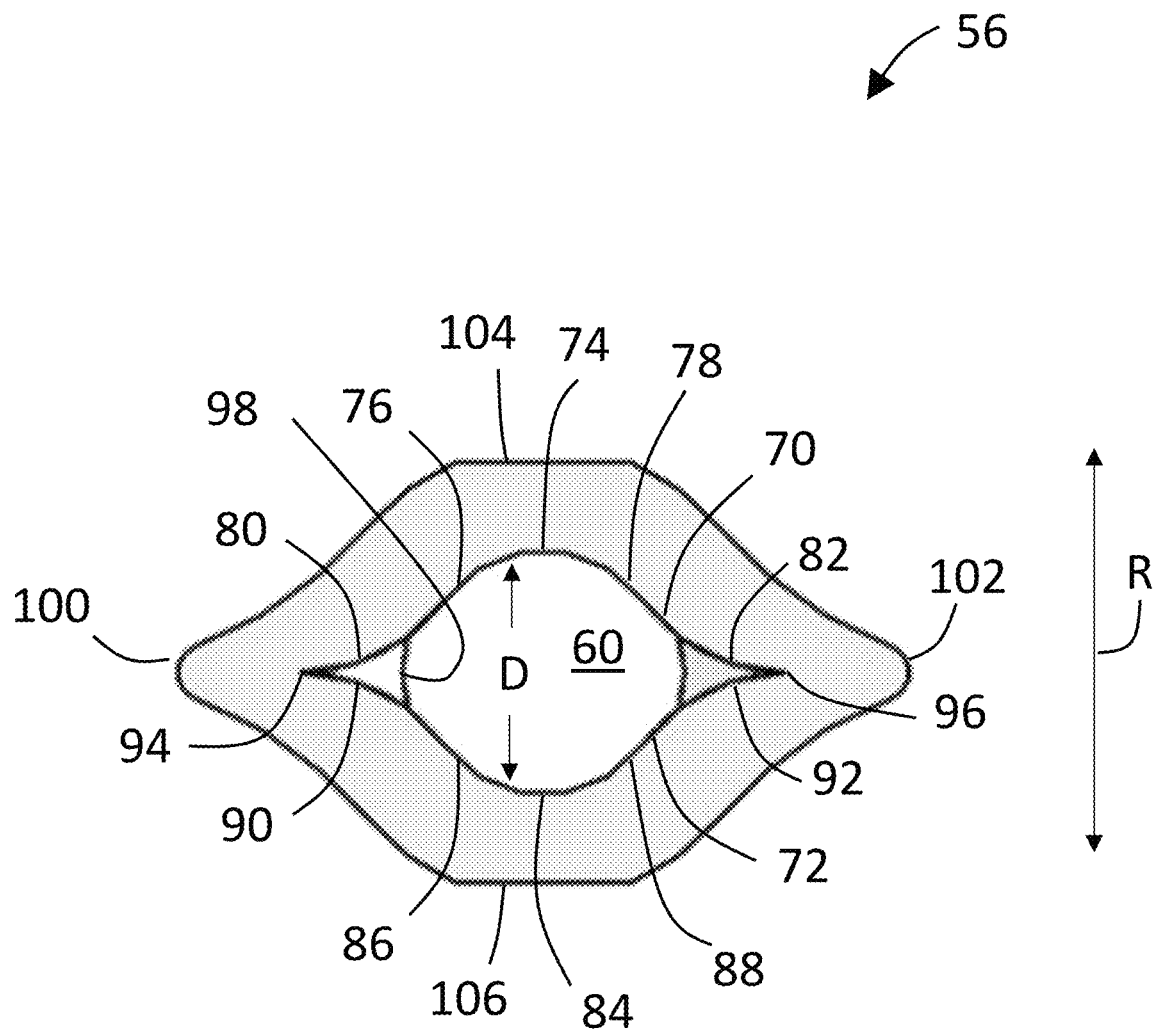
FIG. 3 depicts an embodiment of the pinch valve tube.

FIG. 3 depicts one embodiment of the pinch valve tube 56. The pinch valve tube 56 includes the open interior 60 defined between a first side 70 and a second side 72, each of which are formed in a bell shape. With respect to the bell shape in the first side 70, the bell shape can include a central head 74 having a rounded shape leading to a first waist side 76 and a second waist side 78. Each of the first waists side 76 and second waist side 78 lead to a first flattened lip 80 and a second flattened lip 82, respectively. Tracing the first side 70 from the left side of FIG. 3 to the right side of FIG. 3, it will be appreciated that the first side 70 includes an inflection point in the first waist side 76 as the first side 70 transitions from the first flattened lip 80 to the central head 74. In like fashion, the first side 70 includes an inflection point in the second waist side 76 as the first side 70 transitions from the central head 74 to the first flattened lip 80.

With respect to the bell shape in the second side 72, the bell shape can include a central head 84 leading to a first waist side 86 and a second waist side 88. Each of the first waists side 86 and second waist side 88 lead to a first flattened lip 90 and a second flattened lip 92, respectively. Tracing the second side 72 from the left side of FIG. 3 to the right side of FIG. 3, it will be appreciated that the second side 72 includes an inflection point in the first waist side 86 as the second side 72 transitions from the first flattened lip 90 to the central head 84. In like fashion, the second side 72 includes an inflection point in the second waist side 86 as the second side 72 transitions from the central head 84 to the first flattened lip 90.

The first flattened lip 80 of the first side 70 joins the first flattened lip 90 of the second side 72 at a first corner point 94. The second flattened lip 82 of the first side 70 joins the second flattened lip 92 of the second side 72 at a second corner point 96.

As the pinch valve tube 56 is compressed with the anvil 54, the central heads 74 and 84 can extend and become less rounded in shape, with the first flattened lips 80 and 90 of the first side 70 and second side 72, respectively, beginning to close toward each other. A distance D can be defined in a radial direction R at any point between the first corner point 94. As force is applied via the anvil 54, the distance D between the apex of each central head 74 and 84 can decrease, leading to a reduction in cross-sectional area of the open interior 60. The distance D between corresponding points on the first waist sides 76 and 86, as well as the distance D between corresponding points on the second waist sides 78 and 88, likewise decrease. In similar fashion, the distance D between corresponding points between the first flattened lips 80 and 90 and the distance D between the second flattened lips 82 and 92 also decrease. The rate of decrease between any of these points (e.g., between the apex of each central head 74 and 84, or between corresponding points on the second waist sides 78 and 88, etc.) need not decrease by the same amount or even at the same rate, although in some embodiments that might be the case.

The shape of the open interior 60 at the proximal end 66 and at the distal end 68 can be circular in shape as opposed to bell shaped. FIG. 3 includes illustration of the circular shape 98 of the open interior 60 at the proximal end 66, illustrating the transition of the shape of the open interior 60 as a function of the length L of the pinch valve tube 56. In some embodiments, however, the shape of the open interior 60 can remain the same throughout the length L. In still other forms, the shape may take one form at the proximal end 66 of the pinch valve tube 56 and have another form at the distal end 68 of the pinch valve tube 56.

The outer shape of the pinch valve tube 56 takes an approximate form of the first side 70 and second side 72 by virtue of a thickness of material measured from each of the first side 70 and second side 72. Exceptions to the shape include corner ends 100 and 102 that are rounded in the embodiment of FIG. 3, as well as central flats 104 and 106.

The central flats 104 and 106 can be used to engage with each of the anvil 54 and support surface 58 to provide a distribution of force across the surface in lieu of a point load application of force.

Figure 4:
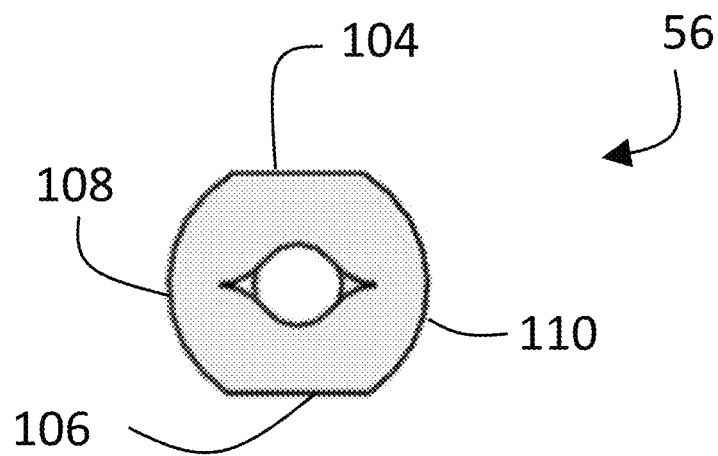
FIG. 4 depicts an embodiment of the pinch valve tube.
Figure 5:
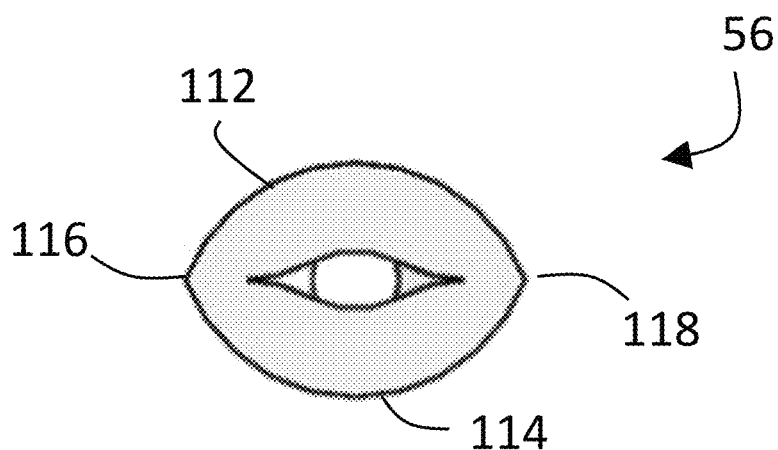
FIG. 5 depicts an embodiment of the pinch valve tube.
Figure 6:
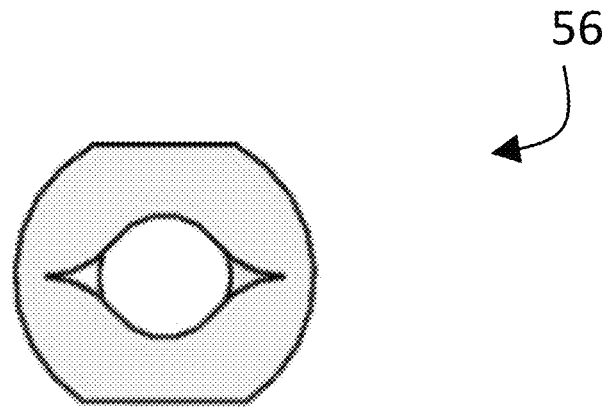
FIG. 6 depicts an embodiment of the pinch valve tube.
Figure 7:
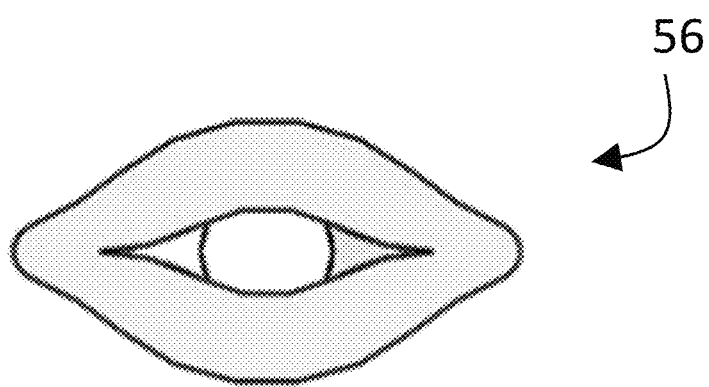
FIG. 7 depicts an embodiment of the pinch valve tube.
Figure 8:
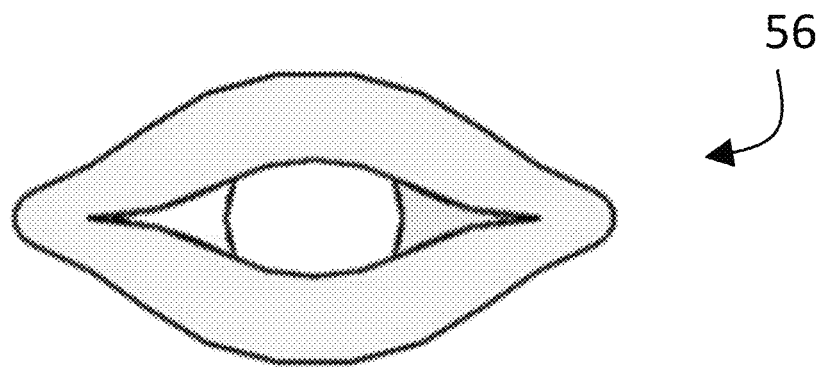
FIG. 8 depicts an embodiment of the pinch valve tube.
Figure 9:
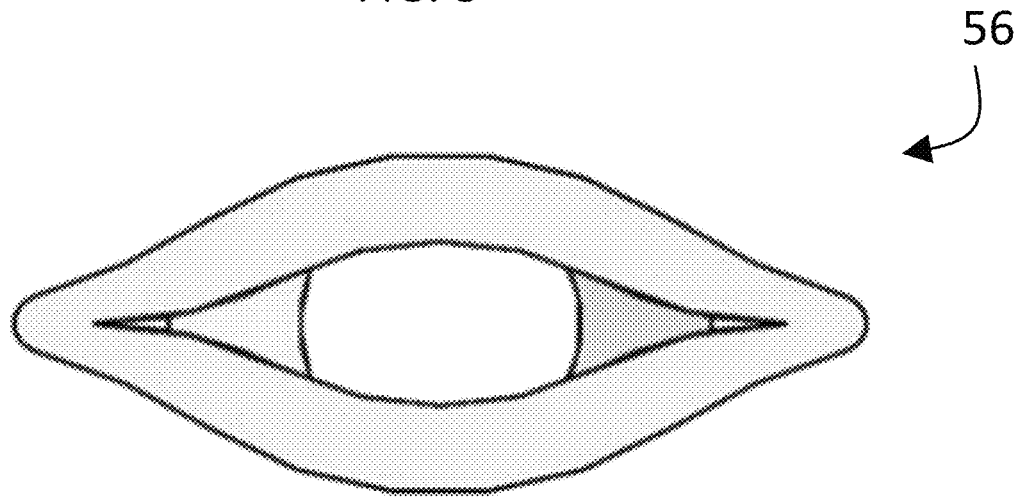
FIG. 9 depicts an embodiment of the pinch valve tube.
Figure 10:
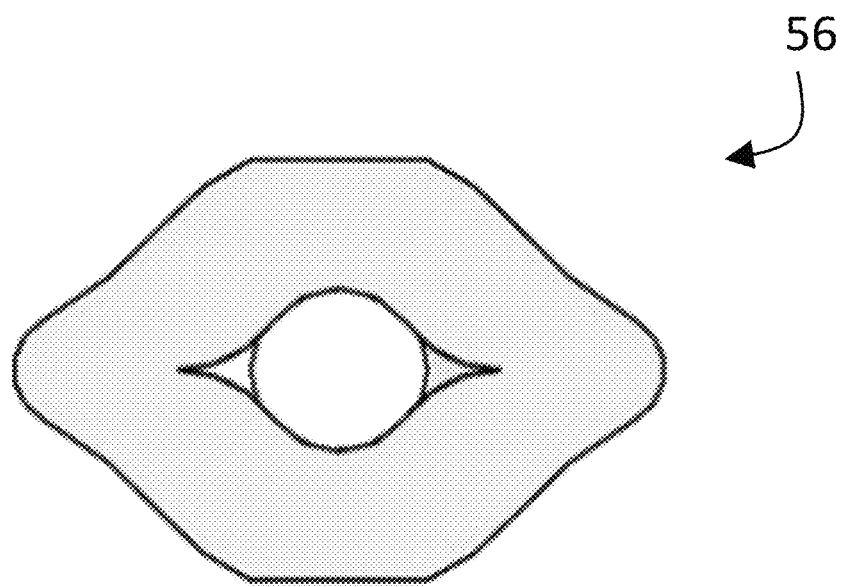
FIG. 10 depicts an embodiment of the pinch valve tube.

FIGS. 4-10 illustrate various other embodiments of a cross section of the pinch valve tube 56. FIG. 4 illustrates an outer shape of the pinch valve tube 56 having the central flats 104 and 106, but with circular sides 108 and 110. FIG. 5 illustrates an outer shape of the pinch valve tube 56 having a rounded top 112 and rounded bottom 114 which meet at discontinuous points 116 and 118. FIGS. 4 and 6 represent the same configuration at different scales (e.g., FIG. 6 represents a larger version of the same configuration of FIG. 4). Likewise, FIGS. 7-9 represent the same configuration at different scales (e.g., FIG. 9 represents a larger version of the same configuration of FIGS. 8 and 7). It will be appreciated, therefore, that the tube dimensions can be scaled to provide any variety of sizing needed in any given application. An example of scalability is provided further herein.

Any of the embodiments of the pinch valve tube 56 can be made using any variety of techniques. In one form the pinch valve tube 56 is made through an extrusion process, but other embodiments may be produced using a molded process. Such an extrusion process may use a moveable mandrel to form the varying cross sections described above of the open interior 60. As will be appreciated, in such a form the elastic material forming the pinch valve tube 56 can be continuous throughout the pinch valve tube 56, including near the first corner point 84 and second corner point 96. In another form, the pinch valve tube 56 can be made in separate halves (e.g., the first half including the first side 70, the second half including the second side 72, with a part line extending between the first corner point 94 and the second corner point 96. When made in halves it will be appreciated that the halves can be joined through any suitable bonding process.

The pinch valve tube may be produced as a continuous length extrusion, or as molded or extruded segments, or printed. The molded or extruded or printed segments may be produced with through the majority of the length with a merging of the geometry into the concentric circular geometry at the very ends of the segment. This feature at the ends of the tube segment enables the use of commercially available fittings/connection components to transition from the invention pinch valve tubing to the media source on one end and out to the application on the other end. The commercially available fittings/connection components that are designed for concentric circular tubing would include barbed fittings, push-to-connect fittings, etc.

The extruded or molded or printed invention tubing may alternatively be produced as a continuous segment of the invention geometry with molded or machined fittings, or application connection features, attached to the ends of the tube. These connection features may be of a variety of machined or molded materials and geometries that seal or are brazed either to the inside or the outside of the invention tube geometry. The connection features provide varying threaded or barbed connections from the invention tubing to the application media source on one end and out to the application on the other end depending on the needs of the application.

FIGS. 11-15 depict test data comparing various dimensions of an embodiment of a pinch valve tube of the instant application to pinch valve tubes of the prior art having comparable cross sectional flow areas, where the pinch valve tubes of the prior art utilize circular cross-sectional area of their open interiors and where the pinch valve tube and the circular cross-sectional shape of the prior art are made with the same technique (e.g., molded, extruded, printed, etc.) with the same material. As illustrated in the various charts of FIGS. 11-15, the pinch valve tubes of the instant application have a greater deflection range associated with its linear response than a deflection range associated with a linear response of a prior art pinch tube having comparable uncompressed cross sectional flow areas. The linear response is that portion of the curve in which the relationship between the internal area (e.g., the internal flow area) and tube deflection (e.g., the deflection caused by relative motion of the anvil 54 to the support surface 58) is approximately linear.

Table 1 below depicts the deflection range associated with the linear response for various different dimensions of the pinch valve tube of the instant application and pinch valve tubes of the prior art having circular cross-sectional area of their open interiors. As can be seen, the pinch valve tubes of the instant application have greater deflection range associated with the linear response than pinch valve tubes of the prior art having circular cross-sectional area of their open interiors. The pinch valve tubes of the prior art having circular cross-sectional area of their open interiors are referred to in Table 1 as "Round", and the pinch valve tubes of the instant application referred to as "Invention." It will be appreciated that the term "Invention" used in Table 1 is exemplary only and that other ranges and geometries of pinch valve tubes of the instant application are contemplated herein. For an equivalent 1/16" tube, the Round has a linear range from 0.075"-0.110", resulting in a total range of deflection of 0.035". At the same 1/16" equivalent tube, the Invention has a linear range from 0.065"-0.110", resulting in a total range of deflection of 0.045". At the 1/16" equivalent tube, the Invention has a 29% increase deflection range of the linear range relationship between deflection and flow area. At the 1/8" equivalent tube, the Invention has a 40% improvement. AT the 3/16" equivalent tube, the Invention has a 56% improvement. The data summarized in Table 1 can also be found in each of FIGS. 11-13.

TABLE 1

| Tube Orifice Equivalent | Tube Geometry | Deflection Range of Near Linear Proportional Control | ** Improved Proportional Resolution of Invention Geometry over Round |
|---|---|---|---|
| 1/16" | Round | .075"-.110" => .035" Deflection | 29% |
|  | Invention | .065"-.110" => .045" Deflection |  |
| 1/8" | Round | .085"-.160" => .075" Deflection | 40% |
|  | Invention | .055"-.160" => .105 Deflection |  |
| 3/16" | Round | .155"-.235" => .080" Deflection | 56% |
|  | Invention | .110"-.235" => .125" Deflection |  |

Table 2 below depicts the deflection range associated with the linear response for various different dimensions of the pinch valve tube of the instant application and pinch valve tubes of the prior art having circular cross-sectional area of their open interiors. The data in Table 2 includes examples of tubing having dimensions that set forth an outside diameter of the tube and an equivalent inside diameter of the tube. For example, the first row of the table sets forth a tube having an outside diameter of ¼" and an equivalent inside diameter of ⅛", while the second row of the table sets forth a tube having an outside diameter of ⅜" with an equivalent inside diameter of ¼". It will be appreciated that the expression "equivalent inside diameter" denotes the equivalent circular diameter that provides a cross sectional area of an uncompressed pinch valve tube, whether it is a 'round' tube (e.g., a tube having a conventional circular cross sectional shape) or an 'invention' tube having any a cross sectional shape of any of the embodiments herein having a cross sectional area equivalent to a circular cross sectional shape of the given dimension. As can be seen, the pinch valve tubes of the instant disclosure have greater deflection range associated with the linear response than pinch valve tubes of the prior art having circular cross-sectional area of their open interiors. The pinch valve tubes of the prior art having circular cross-sectional area of their open interiors are referred to in Table 2 as "Round", and the pinch valve tubes of the instant application referred to as "Invention." It will be appreciated that the term "Invention" used in Table 1 is exemplary only and that other ranges and geometries of pinch valve tubes of the instant application are contemplated herein. For an equivalent ⅛" tube, the Round has a linear range from 0.110"-0.150", resulting in a total range of deflection of 0.040". At the same ⅛" equivalent tube, the Invention has a linear range from 0.060"-0.150", resulting in a total range of deflection of 0.090". At the ⅛" equivalent tube, the Invention has a 125% increase deflection range of the linear range relationship between deflection and flow area. At the ¼" equivalent tube, the Invention has a 300% improvement. The data summarized in Table 1 can also be found in each of FIGS. 14-15.

Figure 11:
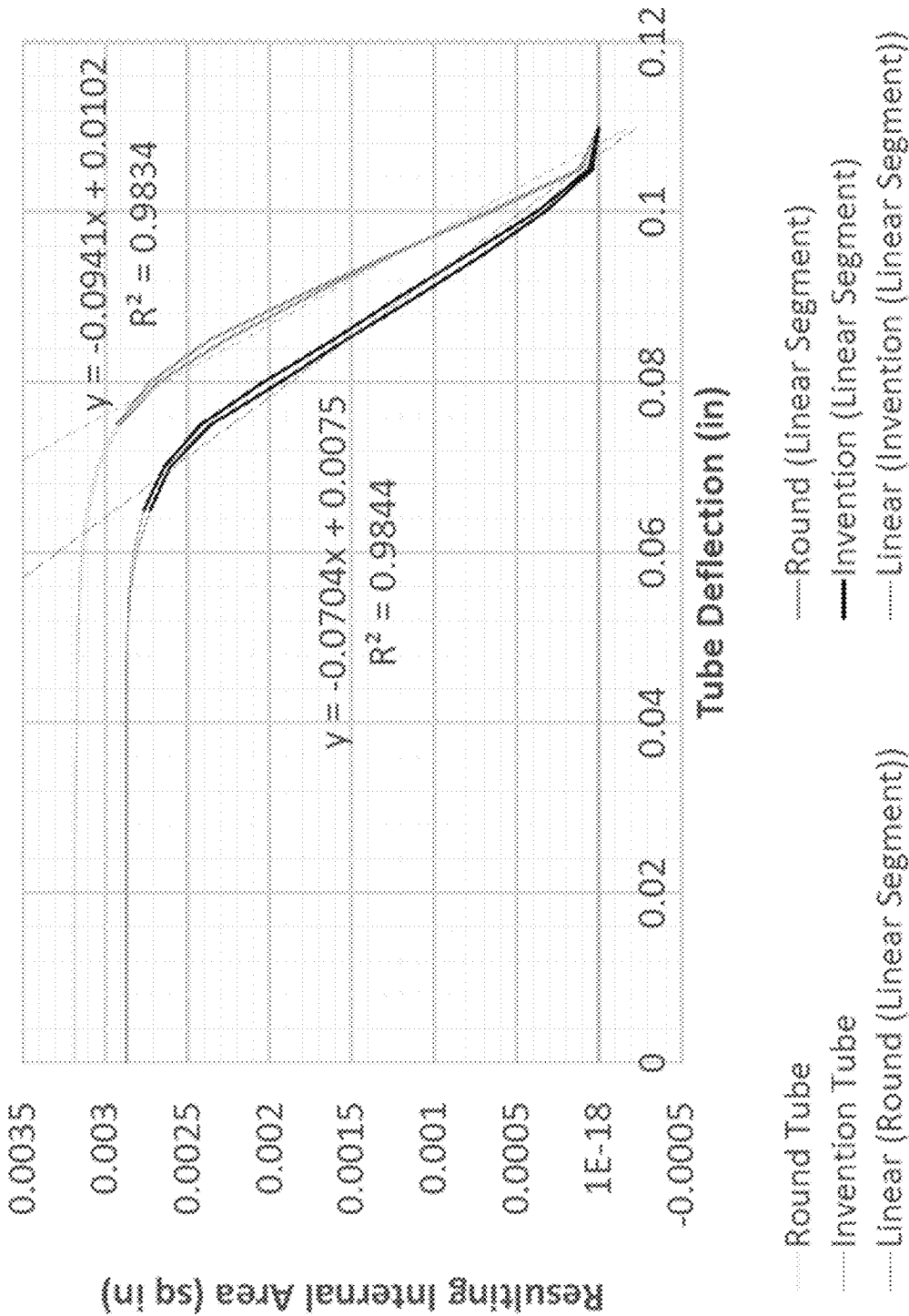
FIG. 11 depicts test data comparing an embodiment of a pinch valve tube of the instant application to a pinch valve tube of the prior art that utilizes circular cross-sectional area of their open interiors.

FIG. 11 illustrates a comparison between a pinch valve tube of the instant application to a pinch valve tube of the prior art having comparable cross sectional flow area, where the comparable cross sectional flow area is the area associated with an approximately 1/16" diameter circular cross-sectional area. As can be seen on the left side of the figure, an offset exists between the round tube (e.g., the tube on the top colored as grey) and the pinch valve tube of the instant application (e.g., the tube on the bottom colored as black). The offset in the illustrated test data is caused by a slightly less internal flow area of a manufactured pinch valve tube of the instant application used for the particular test results illustrated. Correcting for the difference through test data having precise cross sectional area matches will result in comparable results. Multiple data runs were collected for each of the Round and Invention. The legend for the figure identifies the whole curve associated with each of the Round and Invention, as well as the test data used when determining the linear regression (bolded segment of the whole curve for each of the Round and Invention), as well as the dotted lines representing the linear regression curve fit. The results depicted in FIG. 11 illustrate a curve fit using linear regression, with respective $R^2$ values each exceeding 0.98. The deflection range associated with the linear relationship satisfying the $R^2$ value are depicted in Table 1 above. The absolute magnitude of the slope of the Invention (0.0704) is lower than the absolute magnitude of the slope of the Round (0.0941). Thus, not only is the deflection range associated with the linear relationship greater for the Invention, the absolute magnitude of the slope of the linear relationship is lower. Either or both of these improvements lead to finer control via the controller 53.

Figure 12:
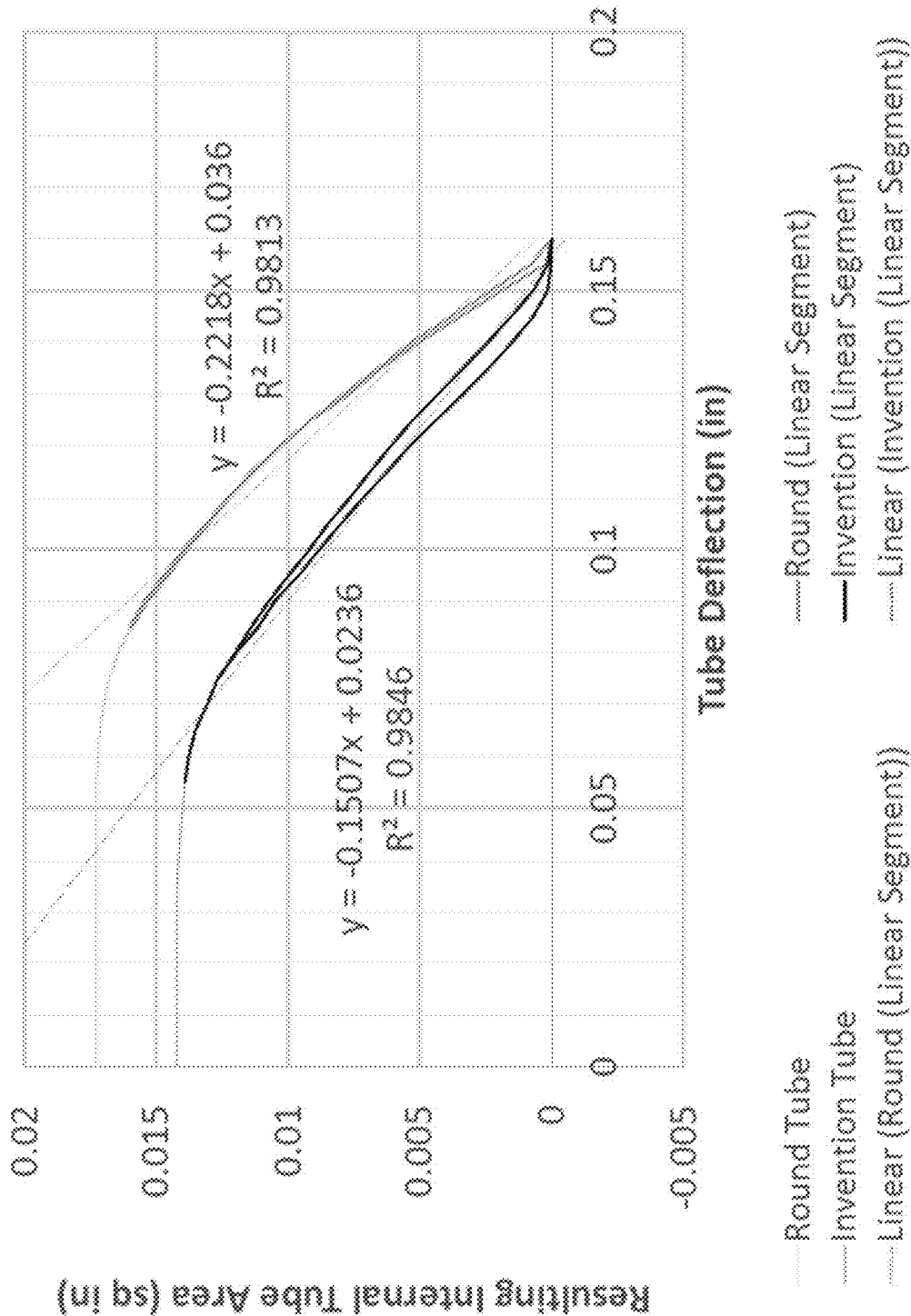
FIG. 12 depicts test data comparing an embodiment of a pinch valve tube of the instant application to a pinch valve tube of the prior art that utilizes circular cross-sectional area of their open interiors.

FIG. 12 illustrates a comparison between a pinch valve tube of the instant application to a pinch valve tube of the prior art having comparable cross sectional flow area, where the comparable cross sectional flow area is the area associated with an approximately ⅛" diameter circular cross-sectional area. As can be seen on the left side of the figure, an offset exists between the round tube (e.g., the tube on the top colored as grey) and the pinch valve tube of the instant application (e.g., the tube on the bottom colored as black). The offset in the illustrated test data is caused by a slightly less internal flow area of a manufactured pinch valve tube of the instant application used for the particular test results illustrated. Correcting for the difference through test data having precise cross sectional area matches will result in comparable results. Multiple data runs were collected for each of the Round and Invention. The legend for the figure identifies the whole curve associated with each of the Round and Invention, as well as the test data used when determining the linear regression (bolded segment of the whole curve for each of the Round and Invention), as well as the dotted

TABLE 2

Proportional Resolution of Pinch Valve Tubing
Concentric Round Tubing vs Invention Geometry Tubing

| Tubing Equivalent (OD × ID) | Tube Geometry | Tube Pinch Deflection Range of Linear Proportional Control (Curve Fit $R^2$ > .98) | Improved Proportional Resolution of Invention Geometry over Round |
|---|---|---|---|
| ¼" × ⅛" | Round | .110" thru .150" => .040" Linear Deflection Range | 125% |
| | Invention | .060" thru .150" => .090" Linear Deflection Range | [.090(Invention) − .040(Rnd)]/.040(Rnd) |
| ⅜" × ¼" | Round | .200" thru .240" => .040" Linear Deflection Range | 300% |
| | Invention | .080" thru .240" => .160" Linear Deflection Range | [.160(Invention) − .040(Rnd)]/.040(Rnd) |

(Reference Corresponding "Pinched Internal Tube Area vs Tube Pinch Deflection" FIGS.)

lines representing the linear regression curve fit. The results depicted in FIG. 12 illustrate a curve fit using linear regression, with respective $R^2$ values each exceeding 0.98. The deflection range associated with the linear relationship satisfying the $R^2$ value are depicted in Table 1 above. The absolute magnitude of the slope of the Invention (0.1507) is lower than the absolute magnitude of the slope of the Round (0.2218). Thus, not only is the deflection range associated with the linear relationship greater for the Invention, the absolute magnitude of the slope of the linear relationship is lower. Either or both of these improvements lead to finer control via the controller 53.

Figure 13:
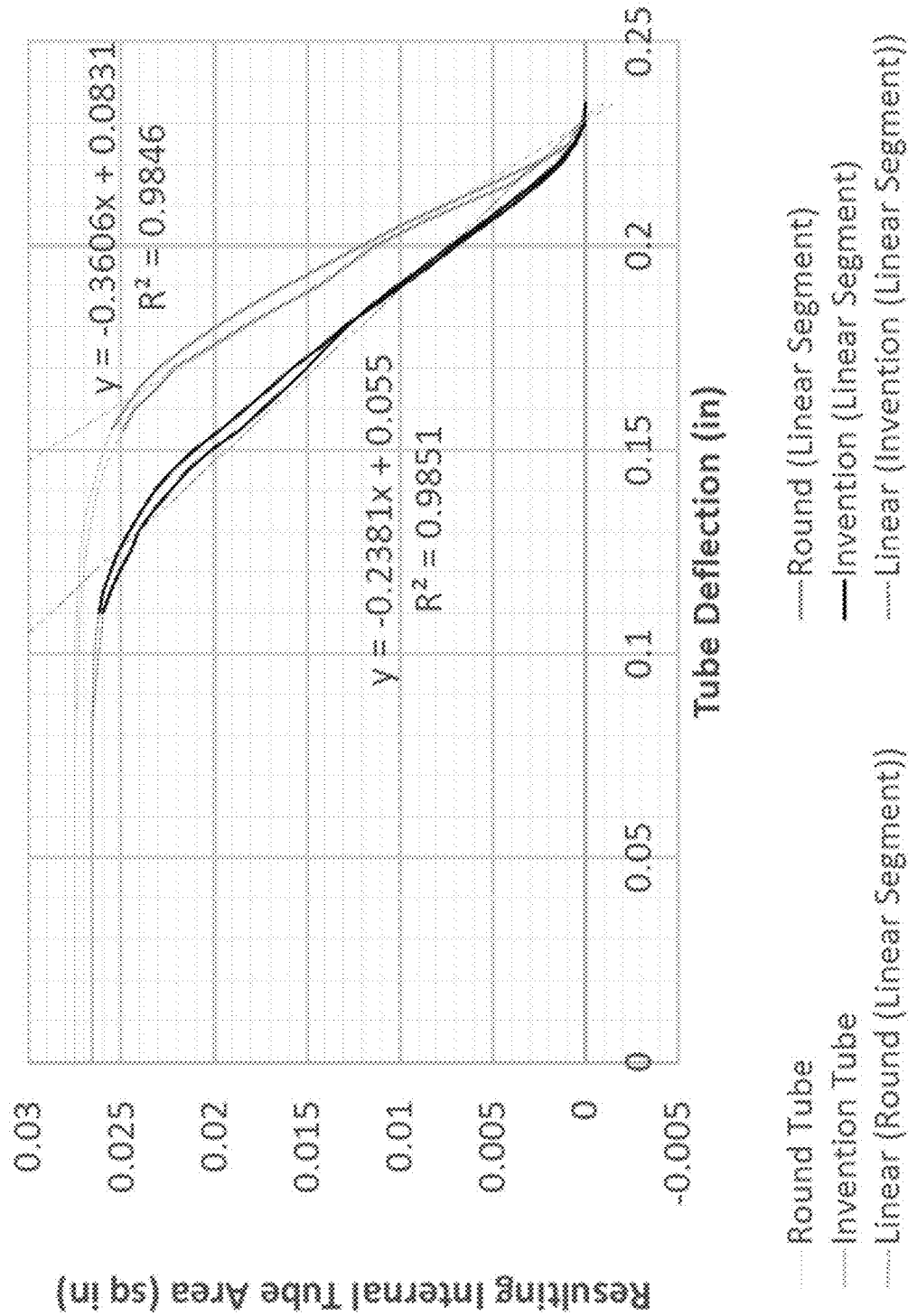
FIG. 13 depicts test data comparing an embodiment of a pinch valve tube of the instant application to a pinch valve tube of the prior art that utilizes circular cross-sectional area of their open interiors.

FIG. 13 illustrates a comparison between a pinch valve tube of the instant application to a pinch valve tube of the prior art having comparable cross sectional flow area, where the comparable cross sectional flow area is the area associated with an approximately ⅛" diameter circular cross-sectional area. As can be seen on the left side of the figure, an offset exists between the round tube (e.g., the tube on the top colored as grey) and the pinch valve tube of the instant application (e.g., the tube on the bottom colored as black). The offset in the illustrated test data is caused by a slightly less internal flow area of a manufactured pinch valve tube of the instant application used for the particular test results illustrated. Correcting for the difference through test data having precise cross sectional area matches will result in comparable results. Multiple data runs were collected for each of the Round and Invention. The legend for the figure identifies the whole curve associated with each of the Round and Invention, as well as the test data used when determining the linear regression (bolded segment of the whole curve for each of the Round and Invention), as well as the dotted lines representing the linear regression curve fit. The results depicted in FIG. 13 illustrate a curve fit using linear regression, with respective $R^2$ values each exceeding 0.98. The deflection range associated with the linear relationship satisfying the $R^2$ value are depicted in Table 1 above. The absolute magnitude of the slope of the Invention (0.2381) is lower than the absolute magnitude of the slope of the Round (0.3606). Thus, not only is the deflection range associated with the linear relationship greater for the Invention, the absolute magnitude of the slope of the linear relationship is lower. Either or both of these improvements lead to finer control via the controller 53.

Figure 14:
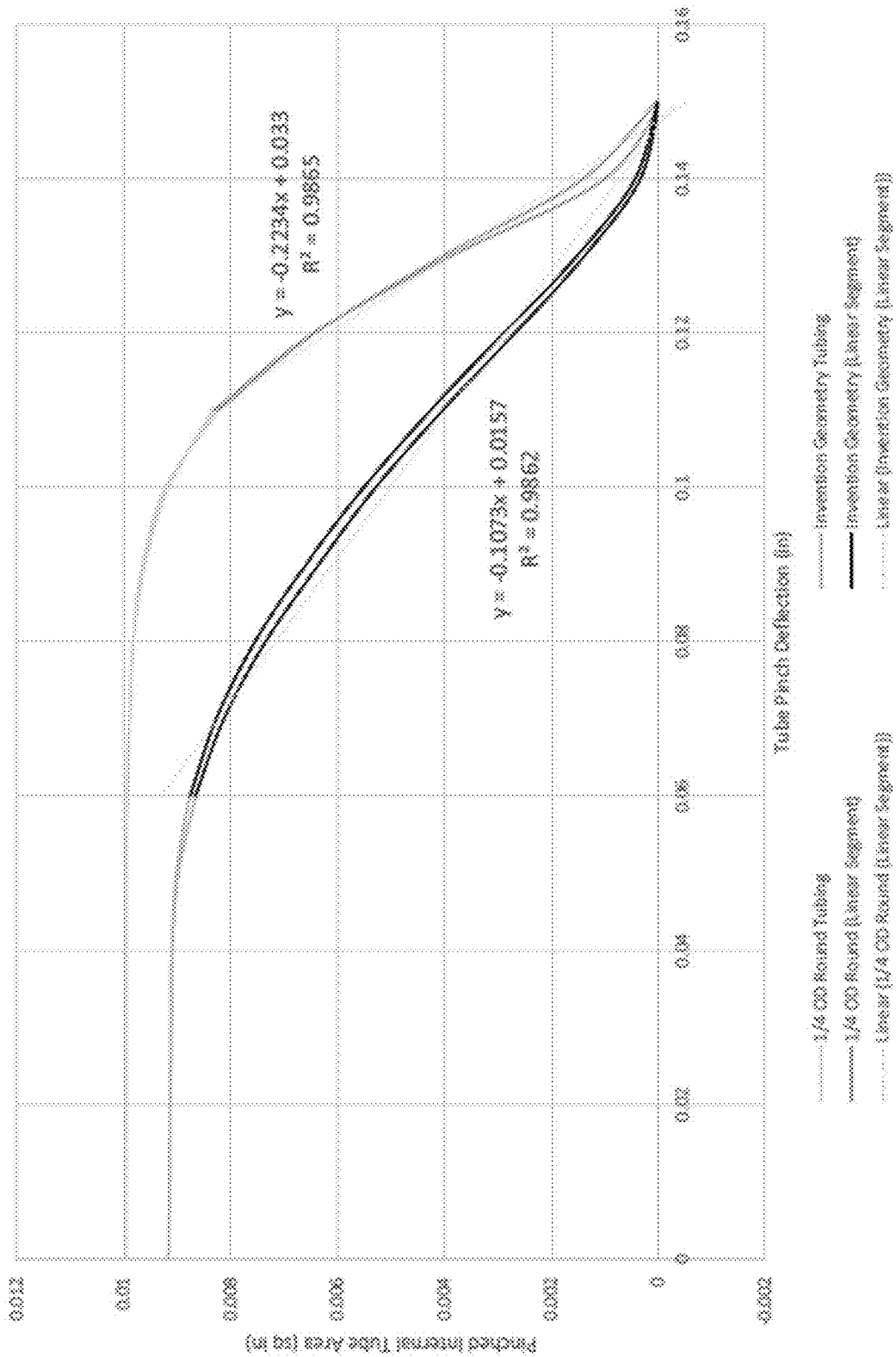
FIG. 14 depicts test data comparing an embodiment of a pinch valve tube of the instant application to a pinch valve tube of the prior art that utilizes circular cross-sectional area of their open interiors.

FIG. 14 illustrates a comparison between a pinch valve tube of the instant application to a pinch valve tube of the prior art having comparable cross sectional flow area, where the comparable cross sectional flow area is the area associated with an approximately ⅛" inner diameter circular cross-sectional area. The pinch valve tubes, whether the 'round' tubing or the 'invention' tubing each have a ¼" outer diameter. As can be seen on the left side of the figure, an offset exists between the round tube (e.g., the tube on the top colored as grey) and the pinch valve tube of the instant application (e.g., the tube on the bottom colored as black). The offset in the illustrated test data is caused by a slightly less internal flow area of a manufactured pinch valve tube of the instant application used for the particular test results illustrated. Correcting for the difference through test data having precise cross sectional area matches will result in comparable results. Multiple data runs were collected for each of the Round and Invention. The legend for the figure identifies the whole curve associated with each of the Round and Invention, as well as the test data used when determining the linear regression (bolded segment of the whole curve for each of the Round and Invention), as well as the dotted lines representing the linear regression curve fit. The results depicted in FIG. 14 illustrate a curve fit using linear regression, with respective $R^2$ values each exceeding 0.98. The deflection range associated with the linear relationship satisfying the $R^2$ value are depicted in Table 2 above. The absolute magnitude of the slope of the Invention (0.1073) is lower than the absolute magnitude of the slope of the Round (0.3606). Thus, not only is the deflection range associated with the linear relationship greater for the Invention, the absolute magnitude of the slope of the linear relationship is lower. Either or both of these improvements lead to finer control via the controller 53.

Figure 15:
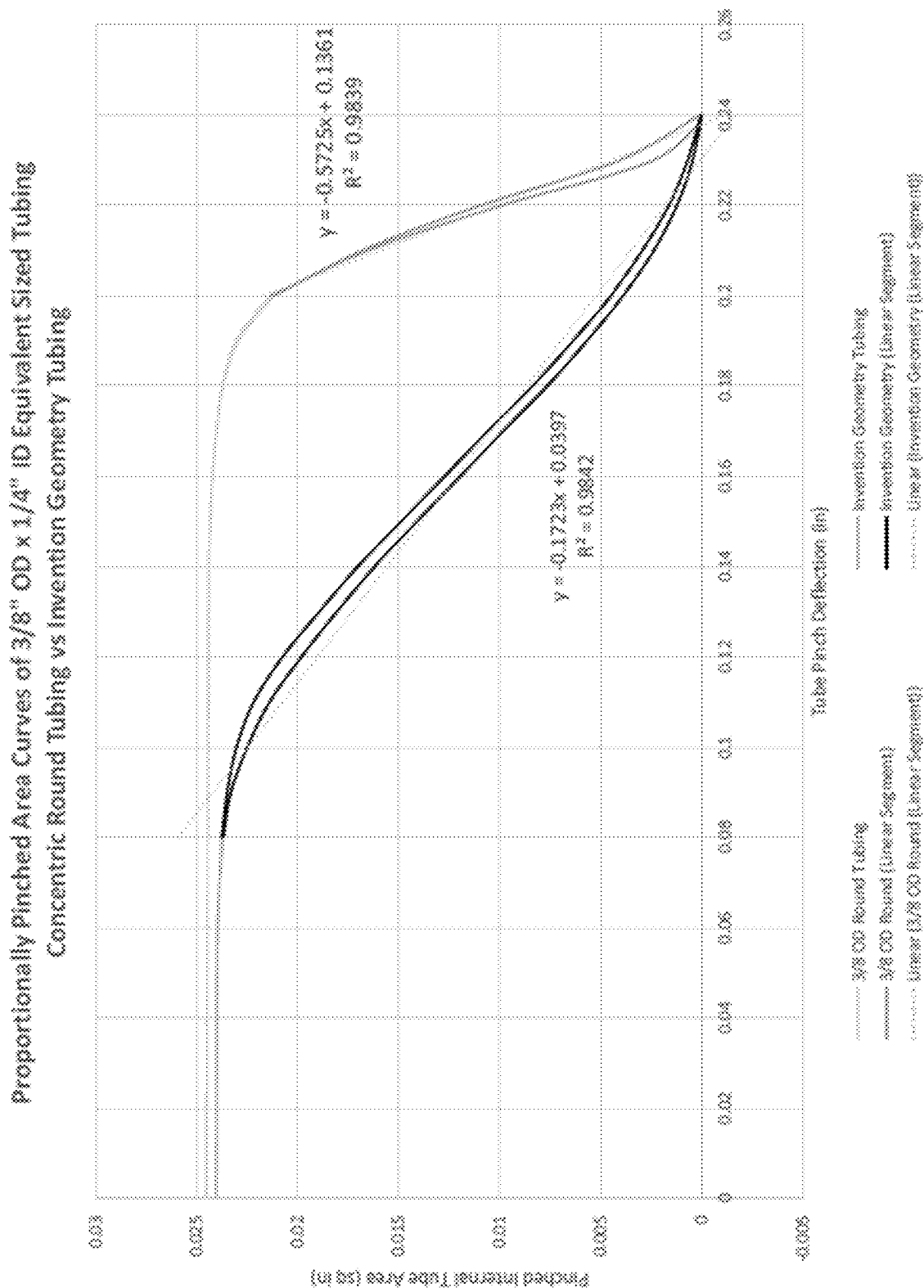
FIG. 15 depicts test data comparing an embodiment of a pinch valve tube of the instant application to a pinch valve tube of the prior art that utilizes circular cross-sectional area of their open interiors.

FIG. 15 illustrates a comparison between a pinch valve tube of the instant application to a pinch valve tube of the prior art having comparable cross sectional flow area, where the comparable cross sectional flow area is the area associated with an approximately ¼" inner diameter circular cross-sectional area. The pinch valve tubes, whether the 'round' tubing or the 'invention' tubing each have a ⅜" outer diameter. As can be seen on the left side of the figure, an offset exists between the round tube (e.g., the tube on the top colored as grey) and the pinch valve tube of the instant application (e.g., the tube on the bottom colored as black). The offset in the illustrated test data is caused by a slightly less internal flow area of a manufactured pinch valve tube of the instant application used for the particular test results illustrated. Correcting for the difference through test data having precise cross sectional area matches will result in comparable results. Multiple data runs were collected for each of the Round and Invention. The legend for the figure identifies the whole curve associated with each of the Round and Invention, as well as the test data used when determining the linear regression (bolded segment of the whole curve for each of the Round and Invention), as well as the dotted lines representing the linear regression curve fit. The results depicted in FIG. 15 illustrate a curve fit using linear regression, with respective $R^2$ values each exceeding 0.98. The deflection range associated with the linear relationship satisfying the $R^2$ value are depicted in Table 2 above. The absolute magnitude of the slope of the Invention (0.1723) is lower than the absolute magnitude of the slope of the Round (0.5725). Thus, not only is the deflection range associated with the linear relationship greater for the Invention, the absolute magnitude of the slope of the linear relationship is lower. Either or both of these improvements lead to finer control via the controller 53.

Figure 16:
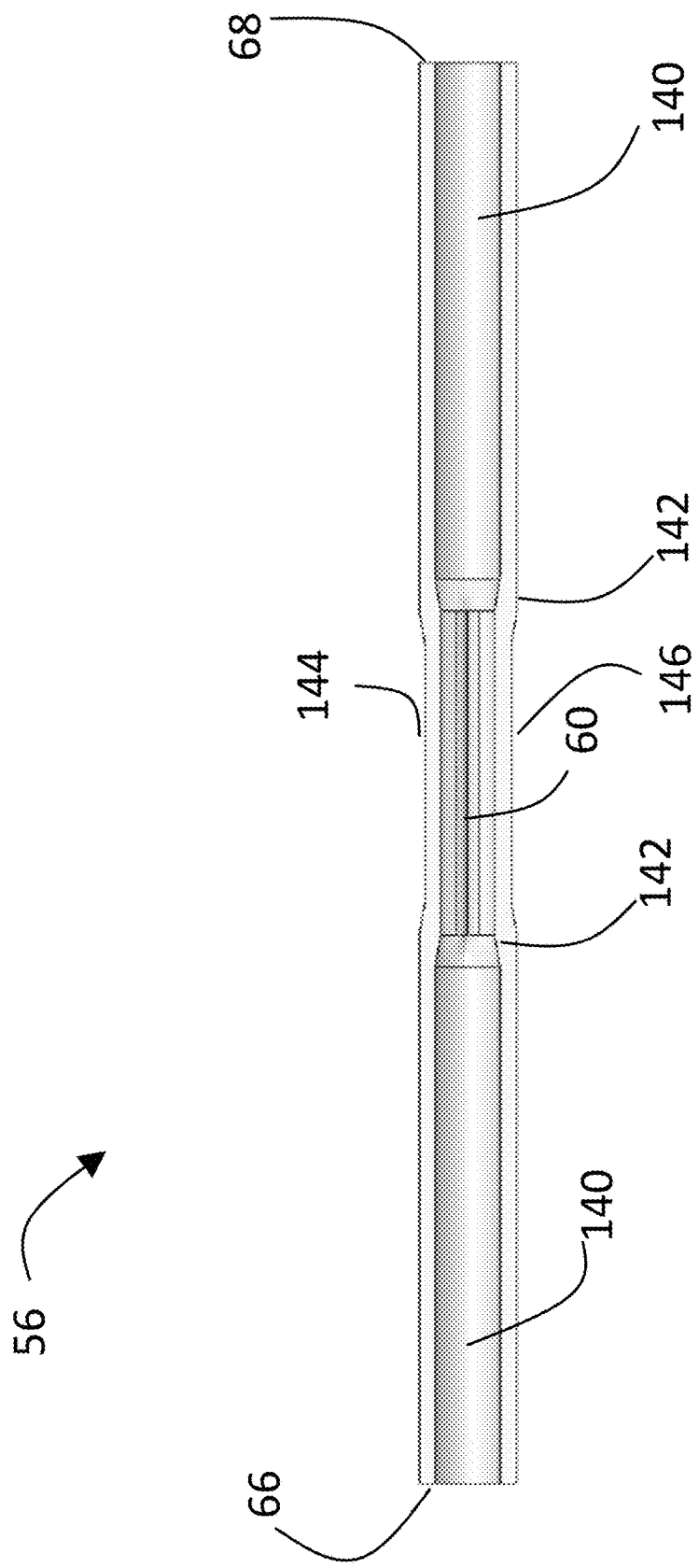
FIG. 16 depicts a side view of one embodiment of a pinch valve tube.

FIG. 16 illustrates a side view of one embodiment of the pinch valve tube 56 that extends between the proximal end 66 and the distal end 68. In the illustrated embodiment, each of the proximal end 66 and distal end 68 include an end interior 140 having a circular cross section. The pinch valve tube 56 transitions shape from the circular cross section of end interior 140 to the open interior 60 in transition zone 142. The transition zone 142 can occur over any suitable length between the proximal end 66 and open interior 60, or between the distal end 68 and the open interior 60. The pinch valve tube 56 further includes a contact surface 144 and contact surface 146 useful to engage the anvil 54 and the support surface 58. As is apparent in the embodiment depicted in FIG. 16, the distal end 66 can include an inner diameter useful to accommodate a fitting (not depicted) which is used to coupled the pinch valve tube 56 to a supply of working fluid (e.g., a supply of pressurized oxygen). The fitting may include a cross sectional area that approximates or equals the cross sectional area of open interior 60. Thus, flow rate of working fluid through the fitting can be approximately the same as flow rate of working fluid through the open interior 60 prior to compression of the pinch valve tube 56.

Figure 17:
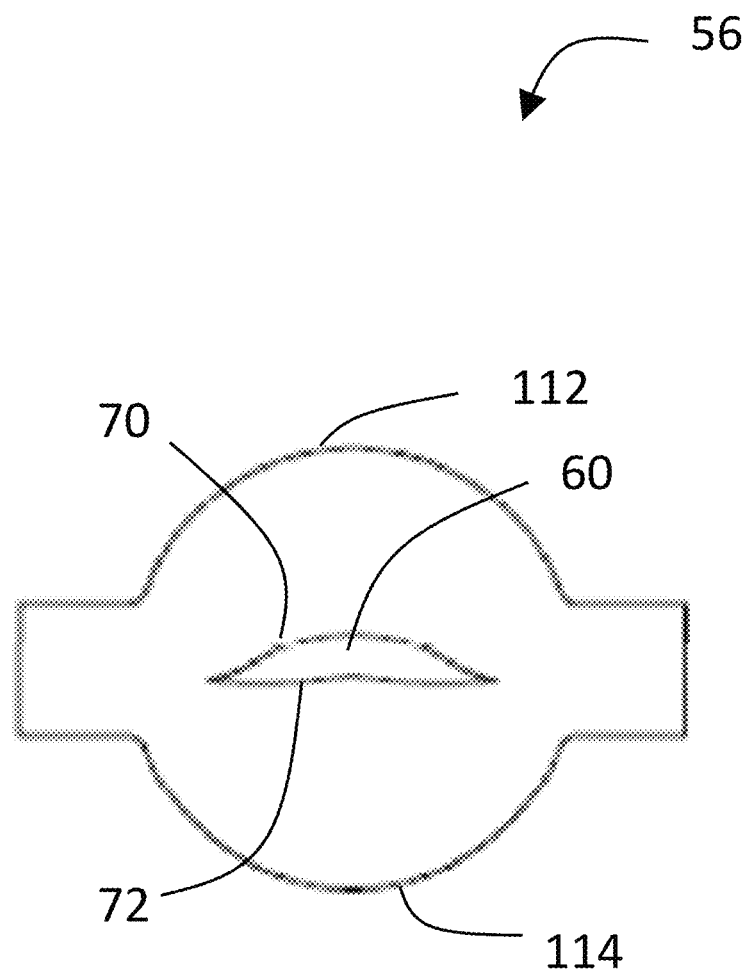
FIG. 17 depicts an embodiment of a pinch valve tube having a first side which is not a mirror image of a second side.

FIG. 17 illustrates an embodiment of the pinch valve tube 56 having a shape of the open interior 60 in which the second side is not a mirror image of the first side. The pinch valve tube 56 of FIG. 17 includes a rounded top 112 and rounded bottom 114. The open interior can be defined between the first side 70 and second side 72 which, because the sides 70 and 72 are not mirror image from each other, necessarily have a different relative dimensions/aspect ratios.

Figure 18:
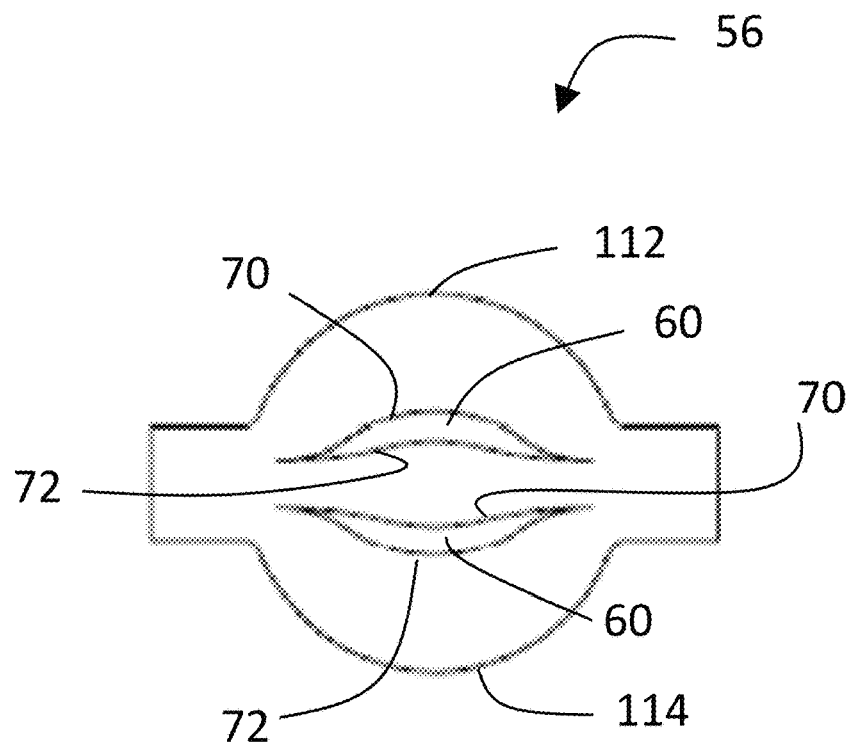
FIG. 18 depicts an embodiment of a computing system.

FIG. 18 illustrates an embodiment of the pinch valve tube 56 having two passages each defined by the sides 70 and 72 which together define respective open interiors 60. The sides 70 and 72 for each of the respective passages in FIG. 18 can have identical shape and size to define identical open interiors 60. In other embodiments, the passages may have one or both of sides 70 and 72 with different shape and/or size thus defining a different open interior 60 between the passages.

Figure 19:
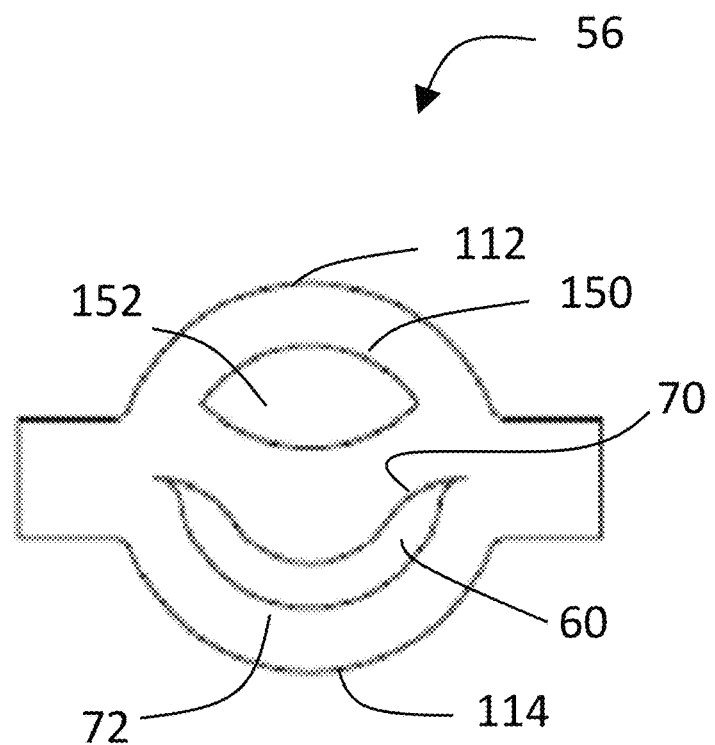
FIG. 19 depicts an embodiment of a method of operating the pinch valve system.

FIG. 19 illustrates an embodiment of the pinch valve tube 56 having a passage defined by the sides 70 and 72 which together define the open interior 60. The pinch valve tube 56 also includes a secondary passage 150 structured to pass a working fluid through a passage interior 152, does not otherwise include the sides 70 and 72 as disclosed herein. Such a pinch valve tube 56 may therefore include a first passage having an open interior 60 defined between sides 70 and 72, as well as a second passage which includes a passage interior 152 that is not defined by sides 70 and 72.

It will be appreciated that any of the embodiments herein can be combined with other embodiments. For example, in forms in which the sides 70 and 72 are mirror images, the aspect ratio of the embodiments may vary. The distance between central head 74 and central head 84 may be bigger in some embodiments relative to the distance between first corner point 94 and second corner point 96. In other additional and/or alternative forms, embodiments having central flat 104 and/or central flat 106 may instead include rounded top 112 and/or rounded top 114. In still other additional and/or alternative forms, embodiments in which the sides 70 and 72 are not mirror images may include any of the variations discussed herein.

In still further forms, the pinch valve tube 56 may have multiple passages between the contact surface 144 and contact surface 146.

Figure 20:
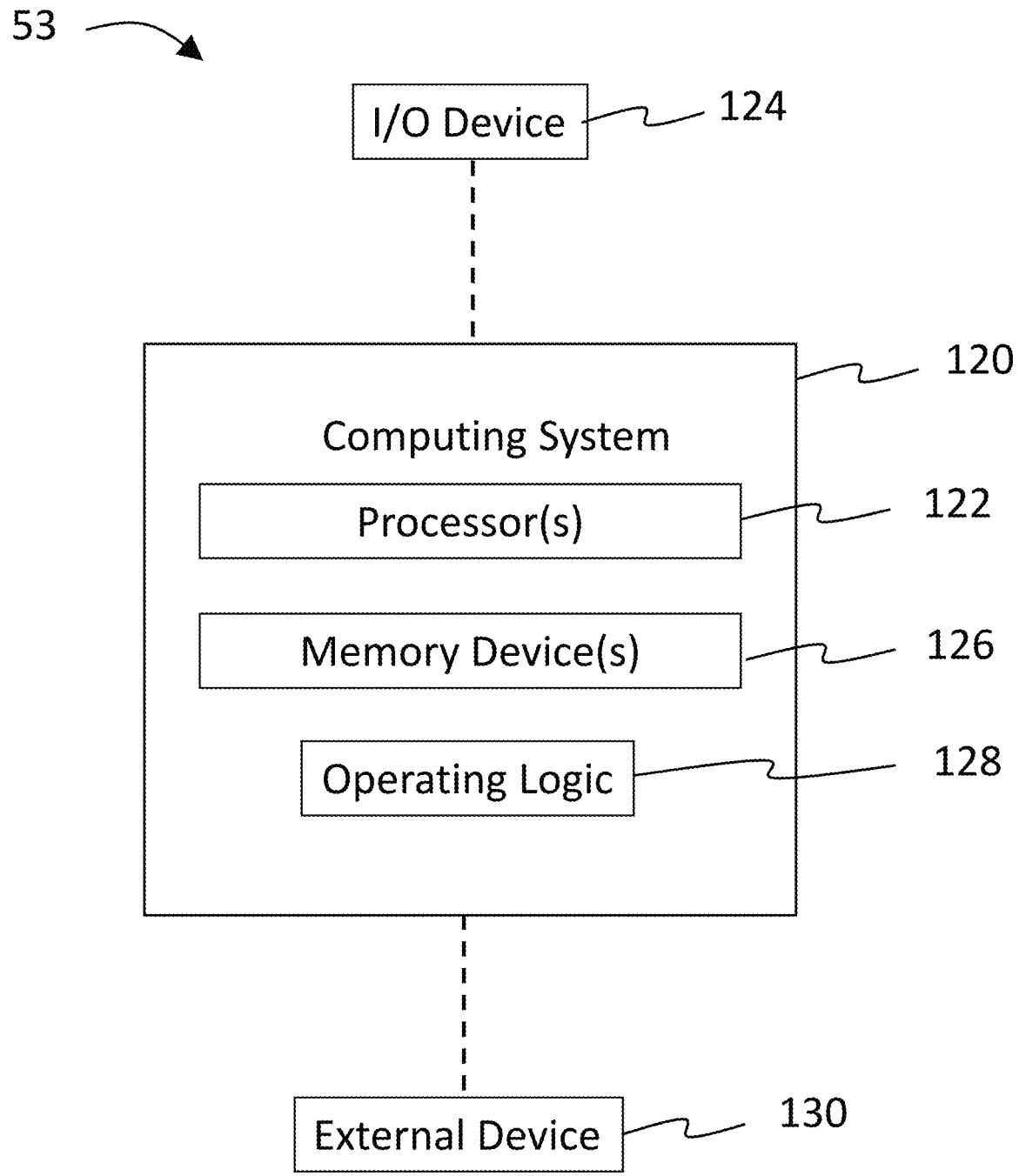
FIG. 20 depicts an embodiments of a controller.

FIG. 20 illustrates one embodiment of the controller 53 in the form of a computing device which can be used to provide open loop or closed loop control of the actuator 52 such as in an environment depicted in FIG. 1. The computing device, or computer, 120 can include a processing device 122, an input/output device 124, memory 126, and operating logic 128. Furthermore, computing device 120 can be configured to communicate with one or more external devices 130 (e.g., another computer device 120 or display capable of displaying information, or the actuator 52). In some forms, the computing device can include one or more servers such as might be available through cloud computing, or can communicate with one or more services such as might be available through cloud computing.

The input/output device 124 may be any type of device that allows the computing device 120 to communicate with the external device 130. For example, the input/output device may be a network adapter, network card, or a port (e.g., a USB port, serial port, parallel port, VGA, DVI, HDMI, Fire Wire, CAT 5, or any other type of port). The input/output device 124 may be comprised of hardware, software, and/or firmware. It is contemplated that the input/output device 124 includes more than one of these adapters, cards, or ports.

The external device 130 may be any type of device that allows data to be inputted or outputted from the computing device 120. To set forth just a few non-limiting examples, the external device 130 may be another computing device, a printer, a display, an alarm, an illuminated indicator, a keyboard, a mouse, mouse button, or a touch screen display. In some forms, there may be more than one external device in communication with the computing device 120, such as, for example, another computing device structured to transmit to and/or receive content from the computing device 120. Furthermore, it is contemplated that the external device 130 may be integrated into the computing device 120. In such forms, the computing device 120 can include different configurations of computers 120 used within it, including one or more computers 120 that communicate with one or more external devices 126, while one or more other computers 120 are integrated with the external device 130.

Processing device 122 can be of a programmable type, a dedicated, hardwired state machine, or a combination of these; and can further include multiple processors, Arithmetic-Logic Units (ALUs), Central Processing Units (CPUs), Graphics Processing Units (GPU), or the like. For forms of processing device 122 with multiple processing units, distributed, pipelined, and/or parallel processing can be utilized as appropriate. Processing device 122 may be dedicated to performance of just the operations described herein or may be utilized in one or more additional applications. In the depicted form, processing device 122 is of a programmable variety that executes algorithms and processes data in accordance with operating logic 128 as defined by programming instructions (such as software or firmware) stored in memory 126. Alternatively or additionally, operating logic 128 for processing device 122 is at least partially defined by hardwired logic or other hardware. Processing device 122 can be comprised of one or more components of any type suitable to process the signals received from input/output device 124 or elsewhere, and provide desired output signals. Such components may include digital circuitry, analog circuitry, or a combination of both.

Memory 126 may be of one or more types, such as a solid-state variety, electromagnetic variety, optical variety, or a combination of these forms. Furthermore, memory 126 can be volatile, nonvolatile, or a mixture of these types, and some or all of memory 126 can be of a portable variety, such as a disk, tape, memory stick, cartridge, or the like. In addition, memory 126 can store data that is manipulated by the operating logic 128 of processing device 122, such as data representative of signals received from and/or sent to input/output device 124 in addition to or in lieu of storing programming instructions defining operating logic 128, just to name one example.

Figure 21:
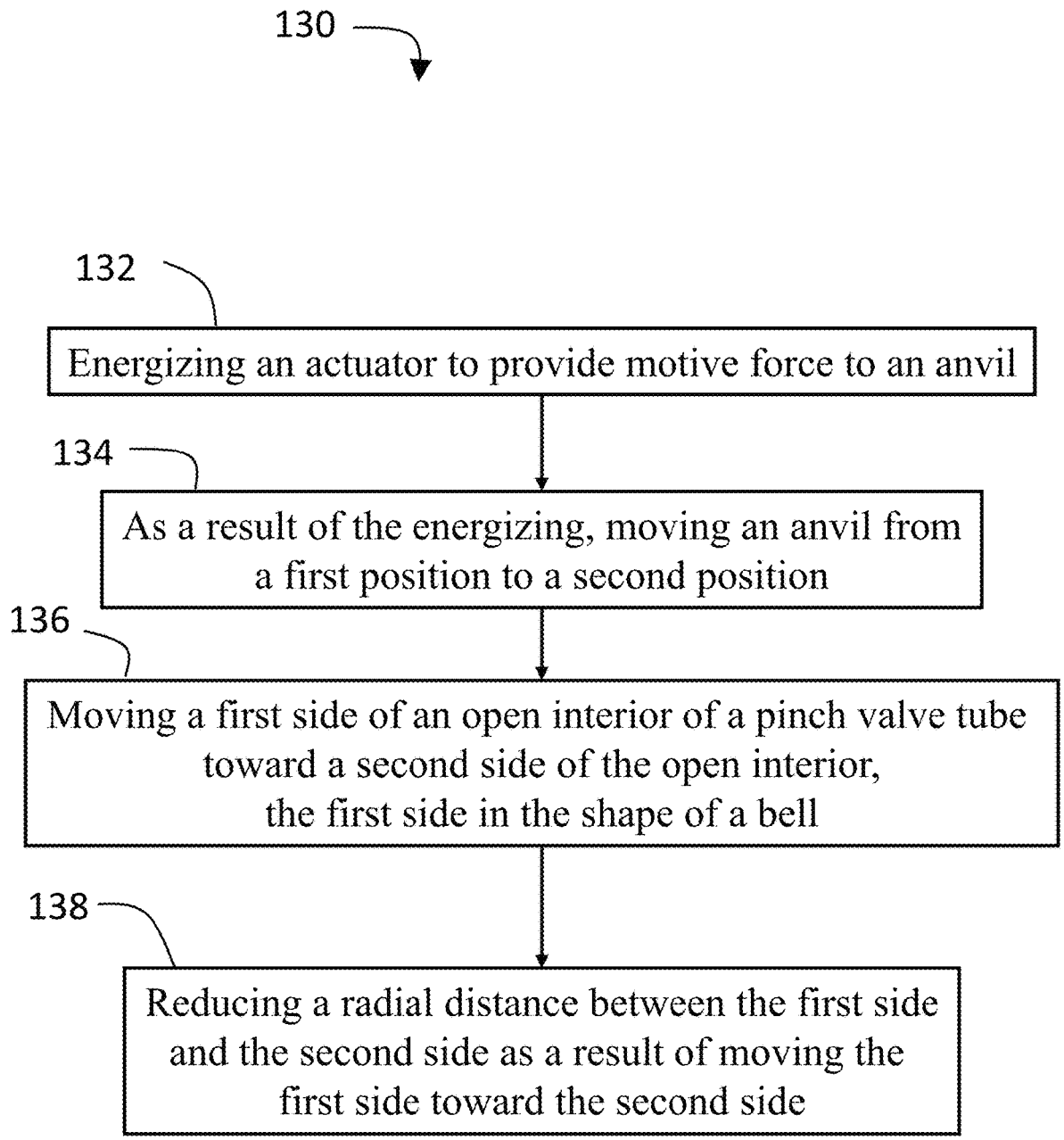
FIG. 21 depicts a method of operating a proportional pinch valve tube.

Turning now to FIG. 21, a method 130 of operating a proportional pinch valve tube 56 is illustrated. At step 132, the method 130 provides energizing an actuator 52 to provide motive force to an anvil 54. As a result of the energizing, method 130 also provides at step 134 of moving the anvil 54 from a first position to a second position. The method 130 also provides at step 136 of moving a first side 70 of an open interior 60 of a pinch valve tube 56 toward a second side 72 of the open interior 60, the first side 70 in the shape of a bell. At step 138, the method 130 provides reducing a radial distance D between the first side 70 and the second side 72 as a result of moving the first side 70 toward the second side 72. The method 130 may further include storing energy in an elastic material of the pinch valve tube 56 as a result of moving the anvil 54 from the first position to the second position. The method 130 may further include moving the anvil 54 from the second position to the first position. The method may further include increasing a radial distance D between the first side 70 and the second side 72 as a result of moving the anvil 54 from the second position to the first position. The energy stored in the elastic material is used to increase the radial distance between the first side and the second side when the anvil is moved from the second position to the first position.

The opposing symmetrical internal walls (e.g., the first side and second side) of the pinch valve tube, when aligned perpendicular with the proportional clamping motion of the anvil, will begin to collapse and seal on each other near the narrow edges of the geometry (e.g., near the corner points). The internal area will continue to narrow as the geometry halves collapse and compress towards each other until the symmetrical halves are completely compressed together. The narrowed features of the collapsing internal area will begin the proportional reduction of the internal area of the curve at less than 30% of the compressible range of the tube, again providing greater resolution and more linear proportional control of the flow of the pressure driven media through the tube than is achievable with concentric circular tube geometry.

Further aspects are provided by the subject matter of the following clauses:

An apparatus comprising: a pinch valve tube configured to be used within a pinch valve system, the pinch valve tube composed of an elastic material and having an open interior extending along a length of the pinch valve tube, the open interior defined between a first side and a second side, each of the first side and the second side having a first flattened lip and a second flattened lip, the first flattened lip of the first side joined to the first flattened lip of the second side to form a first corner point, the second flattened lip of the first side joined to the second flattened lip of the second side to form a second corner point, wherein the open interior is defined between the first corner point and the second corner point.

The apparatus of the preceding clause, wherein the pinch valve tube is of an extruded or molded or printed construction.

The apparatus of any preceding clause, wherein the elastic material is continuous adjacent to the first corner point.

The apparatus of any preceding clause, wherein the elastic material having a stored energy state when an external force is applied to the pinch valve tube to compress the open interior from an uncompressed cross sectional area to a compressed cross sectional area, and wherein the elastic material uses the stored energy to return the cross sectional area from the compressed cross sectional area to the uncompressed cross sectional area upon removal of the external force.

The apparatus of any preceding clause, wherein a radial distance between the first side and the second side is a maximum at a point intermediate the first corner point and the second corner point, and wherein the radial distance between the first side and the second side is at a minimum at the first corner point.

The apparatus of any preceding clause, wherein the radial distance between the first side and the second side is at a minimum at the second corner point.

The apparatus of any preceding clause, wherein the first side includes a bell shape defined between a first end of the first side and a second end of the first side.

The apparatus of any preceding clause, the first side a mirror opposite of the second side.

The apparatus of any preceding clause, wherein the pinch valve tube has a cross sectional flow area, wherein the pinch valve tube has a linear response of tube area relative to tube deflection over a range of tube deflection, and wherein the pinch valve tube has linear response over a greater range of tube deflection than a tube of circular cross section, wherein the tube of circular cross section has an uncompressed cross sectional area that is the same as an uncompressed cross sectional area of the pinch valve tube.

The apparatus of any preceding clause, wherein the outer surface of the pinch valve tube includes a flat.

The apparatus of any preceding clause, which further includes an anvil and motor, the motor structured to provide motive force to the anvil, the anvil structured to engage an outer surface of the pinch valve tube.

An apparatus comprising: a pinch valve tube having a compressible construction and structured to convey a working fluid between a proximal end of the pinch valve tube and a distal end of the pinch valve tube, the pinch valve tube having an open interior defined between a first side and a second side, the first side positioned opposite the second side, the first side having a bell shape defined between a first end of the first side and a second end of the first side, the first side defining a bell shape, wherein the open interior at a position intermediate the proximal end and the distal end includes a cross sectional area having an uncompressed cross sectional area when no external force is applied to the pinch valve tube and a compressed cross sectional area when external force is applied to the pinch valve tube, wherein the compressible construction having a stored energy state when the external force is applied, and wherein the compressible construction uses the stored energy to return the cross sectional area from the compressed cross sectional area to the uncompressed cross sectional area upon removal of the external force. The apparatus of the preceding claim, wherein the bell shape extends from a first end of the first side to a second end of the first side, the bell shape having a central head positioned between the first end and second end, the central head transitioning through a first waist side and a second waist side to each of an opposing first flattened lip and second flattened lip, respectively, at each of the first end and second end, respectively.

The apparatus of any preceding claim, wherein the second side having a bell shape defined between a first end of the second side and a second end of the second side.

The apparatus of any preceding claim, wherein the second side is a mirror image of the first side.

The apparatus of any preceding claim, which further includes a corner point at a joining of the first flattened lip of the first side with the first flattened lip of the second side.

The apparatus of any preceding claim, wherein the open interior at the proximal end includes a cross sectional shape different than the bell shape at the position intermediate the proximal end and the distal end.

The apparatus of any preceding claim, wherein the open interior at the proximal end is circular.

The apparatus of any preceding claim, wherein an outer surface of the pinch valve tube is non-circular.

An apparatus comprising: a pinch valve tube configured to be used within a pinch valve system, the pinch valve tube composed of an elastic material and having an open interior extending along a length of the pinch valve tube, the open interior defined between a first side and a second side, the first side having a first side first end and a first side second end, the second side having a second side first end and a second side second end, the first side first end joined to the second side first end to form a first corner point, the first side second end joined to the second side second end to form a second corner point, wherein the open interior is defined between the first corner point and the second corner point; wherein the open interior has a cross sectional area that varies between a full open cross sectional area corresponding to an uncompressed state of the pinch valve and a full closed cross sectional area corresponding to a closed compressed state of the pinch valve; wherein the pinch valve tube is structured to be compressed over a deflection range of compression between the full open cross sectional area and the full closed cross sectional area, the full open cross sectional area corresponding to no deflection of the deflection range and the full closed cross sectional area corresponding to a maximum deflection of the deflection range; wherein the pinch valve tube includes a linear relationship between the cross sectional area and deflection over a linear deflection range of the pinch valve tube; and wherein the linear relationship of the pinch valve tube occurs over a larger linear deflection range than a deflection range associated with a linear relationship of a circular pinch valve tube between a cross sectional area of the circular pinch valve tube and deflection over a linear deflection range of the circular pinch valve tube where the circular pinch valve tube includes a circular cross sectional area in which a full open cross sectional area of the circular pinch valve tube is the same as the full open cross sectional area of the pinch valve tube.

The apparatus of the preceding claim, wherein the circular pinch valve tube includes a linear relationship between the circular cross sectional area and a deflection over a linear deflection range of the pinch valve tube.

The apparatus of any preceding claim, wherein the linear relationship of the pinch valve tube is at least 30% greater than the linear relationship of the circular pinch valve tube.

The apparatus of any preceding claim, wherein the linear relationship of the pinch valve tube is at least 40% greater than the linear relationship of the circular pinch valve tube.

The apparatus of any preceding claim, wherein the linear relationship of the pinch valve tube is at least 50% greater than the linear relationship of the circular pinch valve tube.

The apparatus of any preceding claim, wherein the linear relationship of the pinch valve tube is at least 100% greater than the linear relationship of the circular pinch valve tube.

The apparatus of any preceding claim, wherein the linear relationship of the pinch valve tube exceeds the linear relationship of the circular pinch valve tube by up to 300%.

A method for operating a proportional pinch valve tube, the method comprising: energizing an actuator to provide motive force to an anvil; as a result of the energizing, moving the anvil from a first position to a second position; moving a first side of an open interior of a pinch valve tube toward a second side of the open interior, the first side in a shape of a bell; and reducing a radial distance between the first side and the second side as a result of moving the first side toward the second side.

The apparatus of the preceding claim, which further includes storing energy in an elastic material of the pinch valve tube as a result of moving the anvil from the first position to the second position.

The apparatus of any preceding clause, which further includes moving the anvil from the second position to the first position.

The apparatus of any preceding clause, which further includes increasing a radial distance between the first side and the second side as a result of moving the anvil from the second position to the first position.

The apparatus of any preceding clause, wherein the energy stored in the elastic material is used to increase the radial distance between the first side and the second side when the anvil is moved from the second position to the first position.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

I claim:

1. An apparatus comprising:
   a pinch valve tube configured to be used within a pinch valve system, the pinch valve tube composed of an elastic material and having an open interior extending along a length of the pinch valve tube, the open interior defined between a first side and a second side, the first side having a first side first end and a first side second end, the second side having a second side first end and a second side second end, the first side first end joined to the second side first end to form a first corner point, the first side second end joined to the second side second end to form a second corner point, wherein the open interior is defined between the first corner point and the second corner point;
   wherein the open interior has a cross sectional area that varies between a full open cross sectional area corresponding to an uncompressed state of the pinch valve and a full closed cross sectional area corresponding to a closed compressed state of the pinch valve;
   wherein the pinch valve tube is structured to be compressed over a deflection range of compression between the full open cross sectional area and the full closed cross sectional area, the full open cross sectional area corresponding to no deflection of the deflection range and the full closed cross sectional area corresponding to a maximum deflection of the deflection range;
   wherein the pinch valve tube includes a linear relationship between the cross sectional area and deflection over a linear deflection range of the pinch valve tube; and
   wherein the linear relationship of the pinch valve tube occurs over a larger linear deflection range than a deflection range associated with a linear relationship of a circular pinch valve tube between a cross sectional area of the circular pinch valve tube and deflection over a linear deflection range of the circular pinch valve tube where the circular pinch valve tube includes a circular cross sectional area in which a full open cross sectional area of the circular pinch valve tube is the same as the full open cross sectional area of the pinch valve tube.

2. The apparatus of claim 1, wherein the circular pinch valve tube includes a linear relationship between the circular cross sectional area and a deflection over a linear deflection range of the pinch valve tube.

3. The apparatus of claim 1, wherein the linear relationship of the pinch valve tube is at least 30% greater than the linear relationship of the circular pinch valve tube.

4. The apparatus of claim 1, wherein the linear relationship of the pinch valve tube is at least 40% greater than the linear relationship of the circular pinch valve tube.

5. The apparatus of claim 1, wherein the linear relationship of the pinch valve tube is at least 50% greater than the linear relationship of the circular pinch valve tube.

6. The apparatus of claim 1, wherein the linear relationship of the pinch valve tube is at least 100% greater than the linear relationship of the circular pinch valve tube.

7. The apparatus of claim 1, wherein the linear relationship of the pinch valve tube exceeds the linear relationship of the circular pinch valve tube by up to 300%.

* * * * *